United States Patent
Sparrow et al.

(10) Patent No.: US 6,738,447 B1
(45) Date of Patent: May 18, 2004

(54) HIGH ENERGY ABSORPTION TOP NOZZLE FOR A NUCLEAR FUEL ASSEMBLY

(75) Inventors: James A. Sparrow, Irmo, SC (US); Yuriy Aleshin, Columbia, SC (US); Aleksey Slyeptsov, Columbia, SC (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 79 days.

(21) Appl. No.: 10/444,469

(22) Filed: May 22, 2003

(51) Int. Cl.[7] .............................. G21C 3/00; G21C 9/00
(52) U.S. Cl. ...................... 376/285; 376/364; 376/445; 376/446
(58) Field of Search .................. 376/364, 178, 376/285, 362, 446, 445

(56) References Cited

U.S. PATENT DOCUMENTS

| | | | |
|---|---|---|---|
| 4,278,501 A | * 7/1981 | Steinke | ........................ 376/364 |
| RE31,583 E | 5/1984 | Klumb et al. | |
| 4,534,933 A | 8/1985 | Gjertsen et al. | |
| 4,670,213 A | * 6/1987 | Wilson et al. | ............... 376/364 |
| 4,687,619 A | 8/1987 | Wilson et al. | |
| 4,702,882 A | 10/1987 | Stucker | |
| 4,762,661 A | * 8/1988 | Leclercq et al. | ............. 376/285 |
| 4,828,792 A | * 5/1989 | Leclercq et al. | ............. 376/364 |
| 4,957,695 A | * 9/1990 | Rudolph | ..................... 376/364 |
| 4,986,959 A | 1/1991 | Sparrow et al. | |
| 5,002,722 A | * 3/1991 | Canat et al. | ................. 376/353 |
| 5,180,549 A | * 1/1993 | Sparrow et al. | ............. 376/364 |
| 5,479,464 A | 12/1995 | DeMario et al. | |

* cited by examiner

Primary Examiner—Harvey E. Behrend

(57) ABSTRACT

A high energy absorption top nozzle for a nuclear fuel assembly that employs an elongated upper tubular housing and an elongated lower tubular housing slidable within the upper tubular housing. The upper and lower housings are biased away from each other by a plurality of longitudinally extending springs that are restrained by a longitudinally moveable piston whose upward travel is limited within the upper housing. The energy imparted to the nozzle by a control rod scram is mostly absorbed by the springs and the hydraulic affect of the piston within the nozzle.

11 Claims, 1 Drawing Sheet

HIGH ENERGY ABSORPTION TOP NOZZLE FOR A NUCLEAR FUEL ASSEMBLY

GOVERNMENT RIGHTS

This invention was conceived, at least in part, under a subcontract under DOE Prime Contract No. DE-AC06-76RL01830, identified as Basic Ordering Agreement No. 32850-A-R5.

BACKGROUND OF THE INVENTION

1. Field of the Invention

This invention relates to top nozzles for nuclear fuel assemblies which accommodate for differences in thermal expansion and irradiation growth of the fuel assemblies and other reactor components and, in particular, to a retrofit expandable top nozzle for use in reactors previously having components composed of essentially the same materials.

2. Related Art

In nuclear reactors of the type designed in the former Soviet Union, the reactor core is comprised of a large number of elongated fuel assemblies, each having a plurality of fuel rods held in an organized hexagonal array by a plurality of grids spaced longitudinally along the fuel rods and secured to stainless steel control rod guide thimbles. The stainless steel control rod guide thimbles extend above and below the ends of the fuel rods and are attached to the top and bottom nozzles, respectively. The fuel assemblies are arranged in the reactor vessel with the bottom nozzles resting on a lower core plate. An upper core plate rests on the top nozzles.

The top nozzles in the Soviet design are non-removably fixed to the stainless steel control rod guide thimbles of the fuel assembly. These complex nozzles perform several functions. First, they position the rod control cluster assembly (RCCA) relative to the guide tubes within the core so that the position of the RCCA relative to the upper core plate is fixed. The RCCA positions the control rods, which are inserted into the fuel assembly as a group or cluster.

The Soviet nozzle also dampens the velocity of the control rods using springs to remove energy when the RCCA rods are dropped into the reactor core during an emergency shutdown, commonly known as a "scram". The nozzle also supplies spring loads for supporting the internals. When the upper core plate is lowered onto the nozzles, it compresses the nozzle spring. In addition, the Soviet nozzle is designed to protect the control rods when the fuel assembly is removed from the reactor vessel. Under these conditions, the RCCA is at or below the top edge of the nozzle. Finally, the Soviet design of the top nozzle allows the fuel assembly to be handled when lifted out of the core by transferring the loads through the nozzle.

Thus, the Soviet nozzle is designed to function in two positions, free and compressed. As stainless steel is used for the thimbles of the Soviet fuel assembly, the relative separation between the interior of the reactor vessel and the fuel assemblies remains constant once the assembly is in position. Spring loads are such that the nozzles can support the internals, and the spring loads as well as the RCCA positions are fixed so that all functions are static. As a result, the nozzle has built-in references around which the internals are designed. The stainless steel thimbles used in the Soviet design impose higher reactivity cost on the fuel assemblies due to their neutron absorption rate, and they are more difficult to attach to the grids of the fuel assemblies. Non-Soviet fuel assemblies utilize zircalloy for the thimbles which imposes less reactivity cost. However, zircalloy has a different constant of thermal expansion than the stainless steel reactor vessel, and grows during irradiation. Expandable top nozzles, which accommodate for these variations in the dimensions of the different components within the reactor are disclosed in, for example, U.S. Pat. Nos. 4,534,933; 4,687,619; 4,702,882 and 4,986,959. Such nozzles, however, are used in reactors in which the top core plate rests on a core support in the form of a circumferential ledge within the reactor vessel. In the Soviet-type reactor, the core plate rests on and is supported by the top nozzles.

As mentioned, the Soviet design top nozzle is permanently attached to the thimble tubes of the fuel assembly. The above-mentioned patents disclose removable top nozzles and U.S. Pat. No. 5,479,464 took that technology to another step in applying the removable top nozzles to the Soviet-type reactor nozzle design. However, the substitution of zircalloy for stainless steel in some of the fuel assembly components, such as the thimble tubes in which the control rods move, requires further modifications to assure that impact loads experienced by the assemblies can be absorbed without damaging the assemblies or other core components. For example, in the VVER 1000-type Soviet designed reactor, when the control rods scram, they freefall and impact the top nozzle at a very high velocity. This fuel design does not use a dashpot or any other hydraulic mechanical device to minimize these high impacts. In the design described in U.S. Pat. No. 5,479,464, springs are employed to absorb some of this load. However, further means are desired to absorb the shock of the load as well as the load itself. During a scram in a VVER 1000-type Soviet designed reactor, the control rod assembly and its driveline freefall into the fuel assembly. In a standard western fuel assembly design, approximately two feet before full insertion of the control rods into the fuel assembly, the tips of the control rods enter a small diameter portion of the thimble tube called the dashpot. This dashpot is approximately one (1) millimeter larger than the control rods. Because the control rods are moving very fast at this point in the scram, there is a large volume of water which has to be accelerated up past the falling control rods to make room for them in the dashpot. This process causes the control rods to decelerate rapidly, thus lessening the impact velocity of the control rod assembly at the top nozzle adapter plate. The standard VVER 1000 style fuel assemblies do not have a dashpot and therefore the control rod assembly impacts the top nozzle at a much higher velocity. As the kinetic energy is equal to the mass×the velocity$^2$, if the velocity at impact on the VVER 1000 fuel design is four times that of the standard western pressurized water reactor design, then the total energy which has to be absorbed after impact is sixteen (16) times as much.

Accordingly, a new high energy absorption top nozzle is desired that will assure that the impact loads expected during scram events will be absorbed without damaging the nozzle, fuel assembly and/or control rod assembly.

Furthermore, there is a need for an expandable high-energy absorption top nozzle that can accommodate expansion and growth of the zircalloy components of the fuel assembly while supporting the upper core plate in a fixed position.

In addition, there is a need for such an expandable high-energy absorption top nozzle that can absorb the impact of a control rod scram while continuing to support the upper core plate substantially in its fixed location.

SUMMARY OF THE INVENTION

These and other needs are satisfied by the invention which is directed to an expandable top nozzle for a nuclear fuel assembly which includes a tubular barrel having a first end on which the upper core plate seats, and a second end. The tubular barrel further includes a hold-down plate circumferentially affixed to the interior wall of the tubular barrel intermediate the first and second ends and substantially spanning the central opening within the tubular barrel. The hold-down plate has a central opening through which an upper hub plunger assembly can pass and a plurality of peripheral secondary openings within which support tubes can move. The expandable nozzle further includes a subassembly comprising a tubular hub having a closed end and an open end, the open end being slidably positioned in the second end of the barrel. The subassembly further comprises a rod ejection plate and support tubes rigidly securing the rod ejection plate to the hub in fixed axially aligned space relation. The ejection plate is provided with apertures aligned with the support tubes that are affixed within the apertures.

An upper hub plunger assembly surrounds, and is coupled to, an upper portion of the central tube and extends through the central opening in the hold-down plate. The upper hub plunger assembly includes a reaction plate that substantially spans the cross section of the tubular barrel and has apertures sized and aligned to slidably receive the support tubes. In the reaction plate's uppermost position adjacent the hold-down plate, the reaction plate substantially covers the adjacent surface of the hold-down plate. Springs bias the upper hub plunger within the central opening of the hold-down plate, the reaction plate against the lower surface of the hold-down plate and the hold-down plate a predetermined distance from the open end of the tubular hub.

Upon a scram, the RCCA impacts the upper hub plunger assembly, driving it in a direction towards the closed end of the hub. The hydraulic attraction between the hold-down plate and the reaction plate, the hydraulic resistance caused by the displacement of water below the reaction plate as the reaction plate moves down and compression of the springs as the upper hub plunger assembly moves toward the closed end of the hub, absorbs a substantial amount of the energy of the RCCA as the control rods approach the lower portions of the thimble tubes within the fuel assembly.

Preferably, the movement of the tubular barrel in an expanded direction away from the hub is restrained at a given distance from the hub to assure the tubular barrel assembly does not move off the tubular hub.

In the preferred embodiment, the springs surround the support tubes and central tube and substantially extend between the closed end of the hub and the reaction plate. Preferably, the springs are centered and spaced from the exterior wall of the corresponding support tube and central tube that it surrounds so that movement of the spring does not damage the tube's surface. Desirably, some of the springs extend through openings in the reaction plate and rest against the hold-down plate to support the upper core plate in position during a scram. The support tubes extend to the rod ejection plate. The thimble tubes are removably coupled to the rod ejection plate within the fuel assembly. The central tube is adapted to slidably mount within a corresponding instrument tube within the fuel assembly. In this way, an integral assembly is formed with a removable, expandable nozzle capable of absorbing the large impact loads of an RCCA scram.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
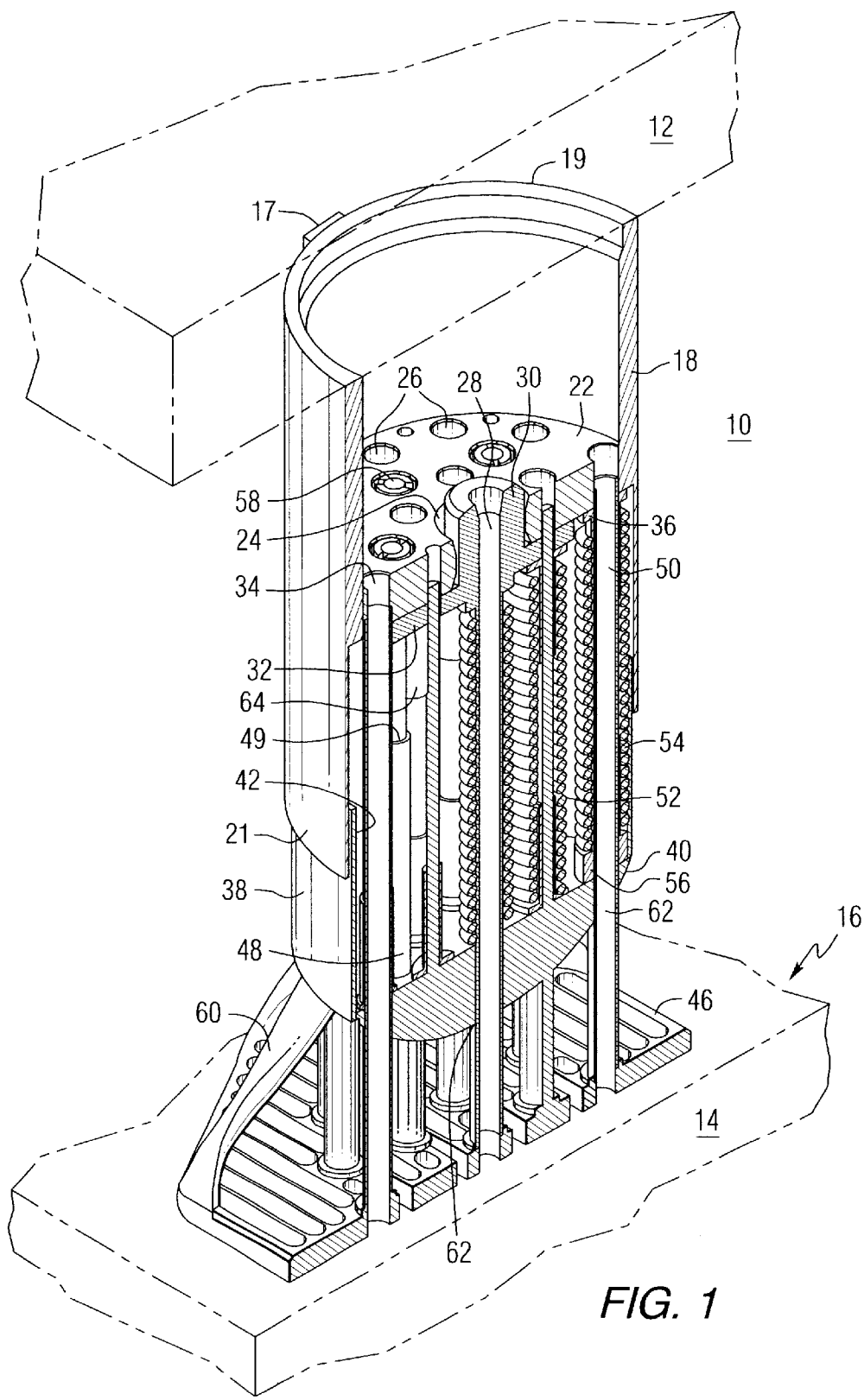
FIG. 1 is a cross-sectional view of an expandable, high energy absorption top nozzle of this invention.

Referring to FIG. 1, the expandable, removable top nozzle 10 of the invention comprises a tubular barrel assembly 18 having a first upper end 19 and a second lower end 21. The upper core plate 12 is supported by the top end 19 of the tubular barrel 10. A key 17 in the upper end of the tubular barrel 19, in combination with a corresponding key on the diametrically opposite side of the barrel, is used as a gripping point for lifting the nozzle 10. The key 17 fits into a corresponding keyway on the upper core plate to fix the orientation of the fuel assembly 16. The fuel assembly 16 comprises a fuel element array 14 which is captured between the expandable upper nozzle 10 and a bottom nozzle (not shown). The upper tubular barrel assembly 18 further includes a hold-down plate 22 positioned diametrically across the interior of the tubular barrel 18 approximately intermediate the upper end 19 and the lower end 21 of the tubular barrel 18. The hold-down plate 22 has a number of apertures that extend therethrough, including an enlarged central aperture 24 through which an upper hub plunger assembly 30 passes and peripheral angularly-spaced secondary apertures 26 through which support tubes 50 are slidably positioned. Connecting pins 48 extend from the closed end of the lower hub 40 and are anchored at their ends by connecting pin nuts 58. In this example, there are six such connecting pin locations. The hold-down plate 22 of the upper tubular barrel assembly 18 is slidably moveable over the support tubes 50 and connection pins 48, in the corresponding secondary apertures 26, but is retained by connecting shoulder pin 49 and connecting pin nuts 58.

An assembly comprising a tubular hub casting 38 has a lower closed end 40 and an upper open end 42. The open end 42 is slidably received within the second, lower end 21 of the upper tubular barrel assembly 18. A rod ejection plate 46 is rigidly secured to the lower end 40 of the lower hub casting assembly 38 by the support tubes 50, which extend through the closed end 40 of the lower hub and are secured in corresponding apertures within the rod ejection plate 46. The support tubes 50 are secured in both the rod ejection plate and the corresponding openings 62 in the closed end 40 of the hub by brazing or welding. The support tubes 50 then extend from the rod ejection plate 46 through the lower end 40 of the hub casting and through openings in the reaction plate 34 where they slidably terminate in the corresponding apertures 26 in the hold-down plate 22. The connecting pins 48, previously mentioned, that function as a stop that prevents the support tubes from being withdrawn from the apertures 26 and are secured to the closed end of the lower hub 40. The retaining pins do not prevent the support tubes 50 from sliding within the apertures 26 in the hold-down plate 22 when the hold-down plate is compressed downward under the weight of the top core plate 12 as will be explained hereafter. The rod ejection plate 46 are designed to couple to thimble tubes in the fuel assembly through an intermediate locking sleeve. The peripheral portion of the rod ejection plate is further supported by a plurality of legs 60 that extend between, and are affixed at one end to the lower end of the hub casting 38 and at the other end to the rod ejection plate 46.

An upper hub plunger assembly 30 surrounds, and is attached to, the central tube 28 and may be formed as an integral part thereof. The upper hub plunger assembly 30 includes a reaction plate 32 that extends peripherally out to the interior walls of the upper tubular barrel assembly, in its upper position, substantially adjacent to the lower surface of the hold-down plate 22. The reaction plate 32 includes openings 34 through which the support tubes 50 slidably pass. Some of the openings 34 in the reaction plate are smaller than other openings 36 in the reaction plate to provide clearance for springs that will be described hereafter.

Coil springs 52 and 54 surround a number, if not all, of the support tubes 50 and central tube 28 and extend from a position proximate the closed end 40 of the lower hub casting assembly 38 up to the vicinity of the reaction plate 32 in the case of the springs 52 and the vicinity of the underside of the hold-down plate 22 in the case of the springs 54. The enlarged openings 36 in the reaction plate 32 enable the reaction plate to move downward without compressing the springs 54. For convenience of manufacture, a spring standoff 56 is provided for the springs 54 so that all of the springs 52 and 54 are approximately the same length. In addition, a spring-centering collar 64 is provided around the support tubes 50 to center the springs about the collars and prevent the springs from scarring the exterior walls of the support tubes 50. It should be appreciated that similar collars can be provided for the central tube 28. In addition, it should be appreciated that the springs may be provided to surround some or all of the support tubes and the number and placement of the springs is determined from the load that will be experienced and the balance to be achieved so that the tubular barrel assembly 18 moves smoothly over the lower hub assembly 38 when the upper core plate is placed in position and maintains that position during a scram while absorbing a portion of the added load imposed by the scram. In this preferred embodiment, there are eighteen support tubes that carry springs in addition to the central tube. Three of those springs extend through the reaction plate 32 to rest up against the lower surface of the hold-down plate 22.

When the fuel assembly 16 is loaded into the core of the reactor and the upper core plate 12 is lowered, the upper barrel assembly 18 is forced to move downward. The upper barrel assembly 18 through the integral hold-down plate 22 pushes down on the reaction plate 32 and the three springs 54 which, depending on the spring constant of the three springs 54, may in total deflect all nineteen springs at least partially toward the bottom of the assembly. This action, in combination with the preload on the springs, imparts a hold-down force to the fuel assembly 16, which forces the fuel assembly down on the lower core plate during operation. The connecting pin shoulders 49 function as a travel stop as the reaction plate 32 is forced down and contacts the connecting pin shoulder 49.

During a scram, the rod control cluster assembly (RCCA) falls until it impacts the upper hub on the plunger assembly 30 and then forces the whole reaction plate 32 downward. Three things happen when this occurs. First, sixteen springs 52 of the nineteen hold-down springs begin to deflect toward the bottom of the assembly, which counteracts some of the downward momentum of the RCCA. Secondly, as the top surface of the reaction plate 32 moves away from the bottom plate surface of the hold-down plate 22, a large force is required to hydraulically separate the two plates. This hydraulic force also absorbs a significant amount of energy and helps to slow down the RCCA travel. Thirdly, as the bottom surface of the reaction plate 32 begins to move downward, the volume between that plate and the lower hub casting assembly 38 is reduced and water has to escape out of that area. Although there are several leak paths for the water to get through, when the RCCA velocity is high, there is a relatively large pressure buildup, which again helps to slow down the RCCA. These three conditions, in combination, result in satisfactorily slowing the RCCA prior to any solid impact without damaging any of the individual components of the top nozzle or the control rod assembly.

Thus, the high energy absorption top nozzle of this invention absorbs the high energy of an RCCA and control rod driveline and stops the downward travel of the control rod assembly within the space allowed without damaging either the top nozzle or control rod assembly. The energy absorption comes from a combination of mechanical spring deflections which occur after impact and hydraulic damping from the separation of two plates which are internal to the top nozzle as well as the hydraulic damping from the pressure buildup in the middle chamber of the top nozzle.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A high energy absorption top nozzle for a nuclear fuel assembly having support tubes extending at least partially there through, in which control rods supported by a rod control cluster assembly are slidable, said nozzle comprising:

a tubular barrel having a first end and a second end and a hold-down plate circumferentially affixed to an interior wall of the tubular barrel intermediate the first and second ends of the tubular barrel and substantially spanning a central opening within the tubular barrel, said hold-down plate having an upper surface face directed toward the first end of the barrel and a lower surface face directed toward the second end of the barrel and a central opening through which an upper hub plunger assembly can pass and a plurality of secondary openings within which the support tubes can move;

An assembly comprising a tubular hub having a closed end and an open end, the open end slidably positioned in the second end of said barrel, a rod ejection plate, and the support tubes rigidly securing said rod ejection plate to said hub in fixed axially aligned spaced relation, said rod ejection plate having apertures aligned with said support tubes that are attached thereto;

The upper hub plunger assembly surrounding and coupled to a central tube at an upper portion thereof and extendable at least partially through the central opening in said hold-down plate, comprising a reaction plate substantially spanning the central opening within the tubular barrel and having apertures sized and aligned to slidably receive the support tubes and, in the reaction plate's upper most position adjacent the hold-down plate, the reaction plate substantially covers the lower surface face of the hold-down plate; and spring means for biasing the upper hub plunger at least partially within or just below the central opening of the hold-down plate, the reaction plate against the lower surface face of the hold-down plate and the hold-down plate a predetermined distance from the open end of the tubular hub.

2. The high energy absorption top nozzle of claim 1 wherein the support tubes slidably extend through corresponding apertures in the hold-down plate, including a retaining pin that prevents the support tube from withdrawing from the corresponding aperture in the hold-down plate, thus preventing the tubular barrel from separating from the tubular hub.

3. The high energy absorption top nozzle of claim 2 wherein the retaining pin extends through the reaction plate and hold-down plate.

4. The high energy absorption nozzle of claim 1 wherein the central tube slidably extends through an aperture in the closed end of the hub.

5. The high energy absorption nozzle of claim 4 wherein the spring means comprises a coil spring that encircles the central tube and substantially extends from the closed end of the hub to the reaction plate to bias the reaction plate substantially against the hold-down plate.

6. The high energy absorption nozzle of claim 5 further including a plurality of coil springs respectively encircling at least some of the support tubes substantially extending from the close end of the hub to the reaction plate and resting substantially against the reaction plate or an extension or recess thereof to bias the reaction plate toward the hold-down plate.

7. The high energy absorption nozzle of claim 6 wherein at least some of the support tubes that have coil springs surrounding a portion thereof have spacers that substantially center the spring and space the spring from contact with a wall of the support tube.

8. The high energy absorption nozzle of claim 7 wherein the spacer is a sleeve that surrounds an axial length of said support tubes, inserted between the outer circumference of said support tubes and the inner circumference of the corresponding spring.

9. The high energy absorption nozzle of claim 1 including support legs rigidly securing the peripheral portions of the rod ejection plate to said hub.

10. The high energy absorption nozzle of claim 6 wherein at least some of said springs extend through the reaction plate and rest up against the hold-down plate or an extension or recess thereof.

11. The high energy absorption nozzle of claim 10 wherein the springs that extend through the reaction plate and rest up against a portion of the hold-down plate are designed to have sufficient strength to support the tubular barrel, under the weight of an upper core plate, from moving in the direction of the closed end of the hub when a rod cluster control assembly is scrammed and impacts and drives the upper hub plunger in the direction of the closed end of the hub.

* * * * *